US012084466B1

(12) United States Patent
Even

(10) Patent No.: US 12,084,466 B1
(45) Date of Patent: Sep. 10, 2024

(54) PURIFICATION OF TRIMETHYLSILANOL

(71) Applicant: Honeywell Federal Manufacturing & Technologies, LLC, Kansas City, MO (US)

(72) Inventor: Dakota Even, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/470,776

(22) Filed: Sep. 20, 2023

(51) Int. Cl.
*C07F 7/08* (2006.01)
*C07F 7/20* (2006.01)

(52) U.S. Cl.
CPC ............. *C07F 7/0836* (2013.01); *C07F 7/20* (2013.01)

(58) Field of Classification Search
CPC ......... C07F 7/20; C07F 7/0836; C07F 7/0838
See application file for complete search history.

(56) References Cited

U.S. PATENT DOCUMENTS

| | | | |
|---|---|---|---|
| 4,774,346 A * | 9/1988 | Imai | C07F 7/20 556/456 |
| 7,709,371 B2 | 5/2010 | Bhanap et al. | |
| 9,480,944 B2 | 11/2016 | Ballantyne et al. | |
| 2019/0276322 A1 | 9/2019 | Kim et al. | |

FOREIGN PATENT DOCUMENTS

WO 2021211531 A1 10/2021

OTHER PUBLICATIONS

Arkles, B., et al., "Factors Contributing to the Stability of Alkoxysilanes in Aqueous Solution" Silanes and Other Coupling Agents, pp. 91-104 Ed. K. L. Mittal, VSP, 1992.

Chojnowski, J., "Acid-Catalyzed Condensation of Model Hydroxyl-Terminated Dimethylsiloxane Oligomers. Cyclization vs. Linear Condensation: Intra-Inter Catalysis", Macromolecules 1987, vol. 20, No. 10, 2345-2355, American Chemical Society.

Gomis, Alejandro, et al.,"Operational Limits in Processes with Water, Salt, and Short-Chain Alcohol Mixtures as Aqueous Two-Phase Systems and Problems in its Simulation", Industrial & Engineering Chemistry Research 2021 60(6), 2578-2587, American Chemical Society, https://dx.doi.org/10.1021/acs.iecr.0c05891.

Grubb, W. T., "A Rate Study of the Silanol Condensation Reaction at 25° in Alcoholic Solvents", [Contribution from the Research Laboratory, General Electric Co.], vol. 76, Jul. 5, 1954.

Hyde, Alan M., et al., "General Principles and Strategies for Salting-Out Informed by the Hofmeister Series", Organic Process Research and Development, Department of Process Chemistry, MRL, Merck & Co., Inc., 126 E. Lincoln Ave., Rahway, New Jersey 07065, United States, Org. Process Res. Dev. 2017, 21, 1355-1370, American Chemical Society, https://pubs.acs.org/doi/10.1021/acs.oprd.7b00197.

McNally, Joshua S., et al., "Solute displacement in the aqueous phase of water-NaCl-organic ternary mixtures relevant to solvent-driven water treatment", Royal Society of Chemistry Advances, RSC Adv., 2020, 10, 29516, https://pubs.rsc.org/en/content/articlelanding/2020/RA/D0RA06361D.

Sauer, Robert O., "Trimethylsilanol and its Simple Ethers [Contribution from the Research Laboratory, General Electric Company], Derivatives of the Methylchlorosilanes. I. Trimethylsilanol and its Simple Ethers", vol. 66, Oct. 1944.

* cited by examiner

*Primary Examiner* — Pancham Bakshi
(74) *Attorney, Agent, or Firm* — Erise IP, P.A.

(57) ABSTRACT

Methods, systems, and computer-readable media for purification of trimethylsilanol (TMSOH) from a hexamethyldisiloxane (HMDSO) impurity present within an initial feedstock material. A salt-out assisted liquid-liquid extraction (SALLE) process may be used including adding an extraction solution, extracting the HMDSO impurity, and separating/washing to remove the extraction solution and water from the feedstock such that an increased purity product is provided.

20 Claims, 4 Drawing Sheets

PURIFICATION OF TRIMETHYLSILANOL

STATEMENT OF GOVERNMENT SUPPORT

This invention was made with government support under contract number DE-NA-0002839 awarded by the United States Department of Energy/National Nuclear Security Administration. The government has certain rights in the invention.

BACKGROUND

1. Field

Embodiments of the invention relate to purification techniques. More specifically, embodiments of the invention relate to purification of trimethylsilanol.

2. Related Art

Trimethylsilanol is a colorless liquid substance with a range of applications including hydrophobic coatings and antimicrobial applications. However, commercially available trimethylsilanol rarely meets advertised purity levels and is prone to forming a dimer impurity, known as hexamethyldisiloxane. Dimerization of trimethylsilanol may occur due to a variety of factors including excess heat, excess water, prolonged storage, and exposure to acid. Additionally, because trimethylsilanol and hexamethyldisiloxane have similar boiling points and heating causes further dimerization, purification techniques such as distillation are not suitable for removing the impurity.

SUMMARY

Embodiments of the invention solve the above-mentioned problems by providing a purification process to remove the hexamethyldisiloxane impurity from a trimethylsilanol feedstock via extraction and washing with a variety of substances.

In some aspects, the techniques described herein relate to a method of purifying trimethylsilanol (TMSOH) from hexamethyldisiloxane (HMDSO), the method including: providing a feedstock to an extraction unit, the feedstock including: TMSOH with an HMDSO impurity; adding an extraction solution to the feedstock within the extraction unit, the extraction solution including methanol and water; extracting at least a portion of the HMDSO impurity from the feedstock within the extraction unit; providing the feedstock including the extraction solution from the extraction unit to a phase separation unit; adding a separation solution to the feedstock within the phase separation unit; separating a waste substance from the feedstock from the phase separation unit, the waste substance including at least a portion of the separation solution and the extraction solution; and providing a purified product including TMSOH with a purity of above 95%.

In some aspects, the techniques described herein relate to a method, further including: adding deionized water to the feedstock within a washing unit; and separating a subsequent waste substance including at least a portion of the deionized water and the extraction solution.

In some aspects, the techniques described herein relate to a method, wherein the extraction solution includes a 40/60 methanol to water ratio by weight.

In some aspects, the techniques described herein relate to a method, wherein the extraction solution includes a 30/70 methanol to water ratio by weight.

In some aspects, the techniques described herein relate to a method, wherein the extracting occurs at room temperature.

In some aspects, the techniques described herein relate to a method, wherein the phase separation unit includes a membrane separator.

In some aspects, the techniques described herein relate to a method, wherein the phase separation unit includes a settler column, the method further including: prior to separating the waste substance, allowing a portion of the feedstock to settle into the settler column.

In some aspects, the techniques described herein relate to a method of purifying trimethylsilanol (TMSOH) from hexamethyldisiloxane (HMDSO), the method including: providing a feedstock to an extraction unit, the feedstock including: TMSOH with an HMDSO impurity; adding an extraction solution to the feedstock within the extraction unit at room temperature; extracting at least a portion of the HMDSO impurity from the feedstock within the extraction unit; adding salt water to the feedstock; separating a waste substance from the feedstock at room temperature, the waste substance including at least a portion of the salt water and the extraction solution; and providing a purified product including TMSOH with an increased purity compared to the feedstock.

In some aspects, the techniques described herein relate to a method, further including: providing the feedstock including the extraction solution from the extraction unit to a phase separation unit at room temperature.

In some aspects, the techniques described herein relate to a method, wherein the increased purity of the purified product is above 97%.

In some aspects, the techniques described herein relate to a method, wherein the feedstock is continuously purified within a continuous purification loop.

In some aspects, the techniques described herein relate to a method, wherein the extraction solution includes methanol and water.

In some aspects, the techniques described herein relate to a method, wherein the extraction solution includes ethanol and water.

In some aspects, the techniques described herein relate to a method, further including: drying the feedstock over one or more molecular sieves to thereby remove methanol and water from the feedstock.

In some aspects, the techniques described herein relate to a method, wherein the salt water includes a sodium chloride based salt.

In some aspects, the techniques described herein relate to a method, wherein the salt water includes a calcium chloride based salt.

In some aspects, the techniques described herein relate to a method, further including: after separating the waste substance from the feedstock, adding deionized water to the feedstock; and separating additional waste substance from the feedstock.

In some aspects, the techniques described herein relate to a purification process for purifying trimethylsilanol (TMSOH) from hexamethyldisiloxane (HMDSO), the purification process including: providing a feedstock including: TMSOH with an HMDSO impurity; performing one or more extraction routines including: adding an extraction solution to the feedstock at room temperature; and extracting at least a portion of the HMDSO impurity from the feedstock;

performing a plurality of washing routines, each washing routine of the plurality of washing routines including: adding a separation solution to the feedstock; and separating a waste substance from the feedstock at room temperature, the waste substance including at least a portion of the separation solution and the extraction solution; and providing a purified product including TMSOH with an increased purity compared to the feedstock.

In some aspects, the techniques described herein relate to a purification process, wherein a number of washing routines in the plurality of washing routines and a number of extraction routines in the one or more extraction routines are selected based on a desired purity of the purified product.

In some aspects, the techniques described herein relate to a purification process, wherein at least a portion of the purification process includes a batch process that occurs within a batch reactor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
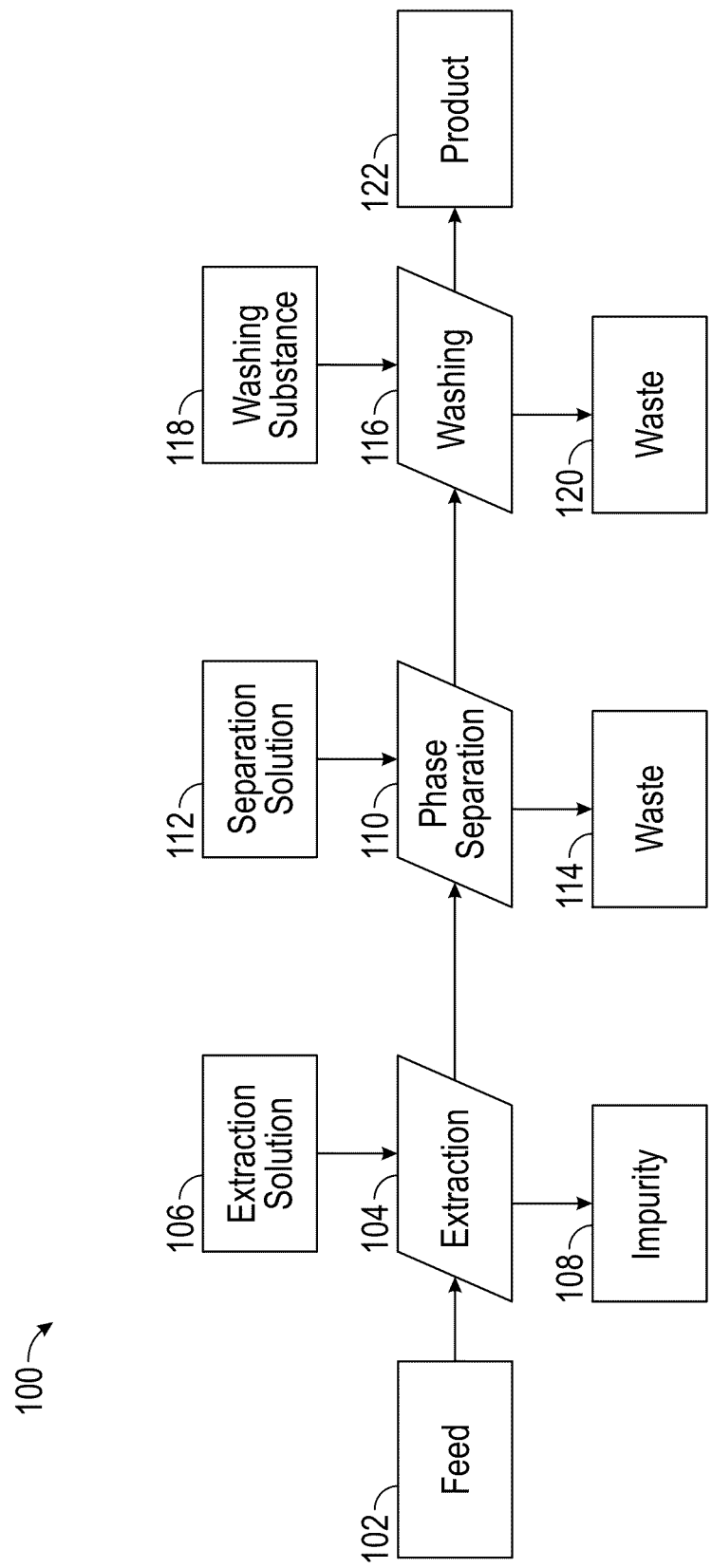
FIG. 1 illustrates a diagram of an exemplary purification process relating to some embodiments of the present disclosure.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments of the present disclosure contemplate a purification process utilizing Salting-out Assisted Liquid-Liquid Extraction (SALLE) to purify a trimethylsilanol feedstock from a hexamethyldisiloxane impurity. Available sources of trimethylsilanol are prone to issues associated with hexamethyldisiloxane impurities forming due to heat, storage over time, exposure to acid, exposure to excess water, and self-reaction of trimethylsilanol molecules. Accordingly, typical trimethylsilanol sources typically fall below advertised purities and contain anywhere from 70-90% or lower purity.

The SALLE techniques described herein introduce an extraction solution that aids in extraction of the impurity. However, it should be understood that the extraction solution introduces waste substances such as, for example, water and methanol. Accordingly, embodiments of the present disclosure contemplate separation and washing techniques to remove waste substances to further improve purity of trimethylsilanol. Further, embodiments of the present disclosure contemplate a purification process that is carried out without any form of excess heating to thereby prevent further dimerization of the feedstock.

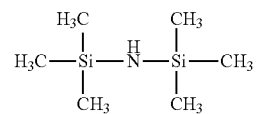

An exemplary formula of a hexamtheyldisilazane (HMDS) molecule is shown above. Hexamtheyldisilazane, also known as bis(trimethylsiyl)amine, is an organosilicon compound and derivative of ammonia with trimethylsilyl groups in place of two hydrogen atoms. The compound is typically in the form of a colorless liquid and is a precursor to popular bases in organic synthesis processes.

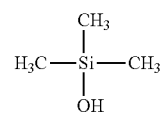

An exemplary formula of a trimethylsilanol (TMSOH) molecule is shown above. TMSOH, also known as hydroxy (trimethyl)silane and TMS, is a colorless volatile liquid. TMSOH may be formed through hydrolysis of other silicone based materials such as HMDS or polydimethylsiloxane (PDMS). However, TMSOH formed by simple hydrolysis of chlorotrimethylsilane produces etherification into hexamethyldisiloxane from by-product hydrochloric acid.

Exemplary uses of TMSOH include hydrophobic coatings for silicate surfaces and antimicrobial agents for antimicrobial applications. TMSOH can be accessible via basic hydrolysis of chlorotrimethylsilane or hexamethyldisiloxane. For example, TMSOH is typically formed from reacting hexamethyldisilazane with water. However, the purity of TMSOH from said hydrolysis techniques is not suitable for high-purity applications. Further, embodiments of the present disclosure have recognized that TMSOH molecules react with one another to form dimerization impurities. Said dimerization of TMSOH produced by said hydrolysis techniques makes long term storage unsuitable.

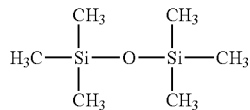

An exemplary formula of a hexamethyldisiloxane (HMDSO) molecule is shown above. HMDSO, also known as bis(trimethylsiyl) ether and bis(trimethylsiyl) oxide, is another organosilicon compound that is a volatile colorless liquid typically used as a solvent and reagent in organic synthesis. Embodiments of the present disclosure recognize HMDSO as a dimerization impurity of TMSOH. It is further recognized that TMSOH and HMDSO have substantially similar boiling points such that separation techniques such as distillation or boiling cannot be used. It is additionally understood that heat from said separation techniques would lead to further dimerization.

FIG. 1 illustrates a diagram of an exemplary purification process 100 relating to some embodiments of the present disclosure. A feedstock 102 is provided to an extraction unit 104. In some embodiments, the feedstock 102 comprises trimethylsilanol (TMSOH) with a hexamethyldisiloxane (HMDSO) impurity. In some cases, the initial feedstock 102 contains anywhere from 5-15% HMDSO. An extraction solution 106 is added to the feedstock 102 within the extraction unit 104. In some embodiments, the extraction solution comprises any combination of acetone, methanol and water, or ethanol and water, as well as other suitable organic solvents. In some embodiments, methanol may be selected as the extraction solvent due to being fully miscible with TMSOH and ease of removal from TMSOH via repeated water washing steps. At least a portion of the impurity 108 is removed from the extraction unit 104. The impurity 108 may comprise the HMDSO present in the initial feedstock. In some embodiments, the impurity 108 is extracted through addition of the extraction solution 106. For example, the extraction solution 106 may bond with at least a portion of the feedstock 102 such that respective portions of the feedstock 102 may be separated into a process substance and the impurity 108. The process substance may comprise the TMSOH along with residual extraction solution 106 still present from the extraction process.

After extraction, the process substance is provided to a phase separation unit 110. A separation solution 112 may be added to the process substance within the phase separation unit 110. A variety of different forms of salts and concentrations thereof are contemplated for the separation solution 112. The separation solution may include salt water in a variety of forms. For example, in some embodiments, a sodium chloride (NaCl) based salt is used. Alternatively, in some embodiments, a calcium chloride (CaCl) based salt is used. Further, in some embodiments, a combination of different salts are used. Further still, in some embodiments, a concentration of salt within the salt water is selected based at least in part on the type of salt used as well as the amount of feedstock and other specific parameters of the feedstock provided. A waste substance 114 is separated from the process substance within the phase separation unit 110. The waste substance 114 comprises any combination of water, salt, salt water, and methanol, as well as additional residual impurity still present within the process substance.

The process substance is provided from the phase separation unit 110 to a washing unit 116. A washing substance 118 is added to the process substance within the washing unit 116. The washing substance 118 may comprise additional salt water or deionized water, as well as combinations thereof. Additional waste substance 120 is removed from the process substance within the washing unit 116. In some embodiments, at least a portion of the product is lost within the washing process, for example, a portion of TMSOH may be removed with the waste substance 114 and the additional waste substance 120. However, the amount of product lost from the separating and washing may be non-substantial.

A purified product substance 122 is provided from the washing unit 116. In some embodiments, the purified product substance 122 comprises TMSOH with an increased purity compared to the initial feedstock 102. For example, in some embodiments, the purified product substance 122 comprises TMSOH with a purity of above 95%. Additionally, in some embodiments, greater product purities are achieved. For example, in some embodiments, the purity of TMSOH within the purified product substance 122 is at least 97%.

It should be understood that the exemplary process 100 shown is just one example and that a variety of other variations of the process are also contemplated. For example, in some embodiments, any number of separation and washing stages are contemplated. For example, in some embodiments, a single separation stage is contemplated and the washing stage of the washing unit 116 may not be included. Further, in some embodiments, the number of separation and washing stages may be selected based on a desired purity of the purified product substance 122. Similarly, in some embodiments, a plurality of extraction routines may be performed and a particular number of extraction routines may be performed to achieve a desired purity of the purified product. For example, it may be determined that three extraction routines may be performed to achieve a particular purity level of the product and the number of extraction routines may be increased or decreased to thereby increase or decrease the purity of the product respectively. Additionally, or alternatively, in some embodiments, any number of stages may be combined or performed within the same or different devices. For example, in some embodiments, the extraction unit 104, the phase separation unit 110, and the washing unit 116 may be combined into a single unit such as a single stirring unit with a plurality of inlets and outlets.

The purification process 100, as described above, may occur at room temperature or ambient temperature without any active heating to prevent additional dimerization of the impurity substance. Additionally, in some embodiments, active cooling may be included to prevent heating of the feedstock and process substance to thereby prevent dimerization of TMSOH into HMDSO. For example, one or more chillers may be included to cool the feedstock 102 and process substance at various stages of the purification process 100. However, it should be understood that embodiments are contemplated in which no active cooling or heating are included.

In some embodiments, the purification process 100, as described above, may be adapted for any of a continuous process or a batch process. For example, in some embodiments, at least a portion of the purification process 100 comprises a batch process that occurs within a batch reactor. Further, the equipment used within the process may be flexibly selected between a range of suitable equipment. For example, a system for performing the process 100 may include any combination of extraction units, phase separators, mixers, chillers, pumps, inlets, outlets, and other suitable components.

Figure 2:
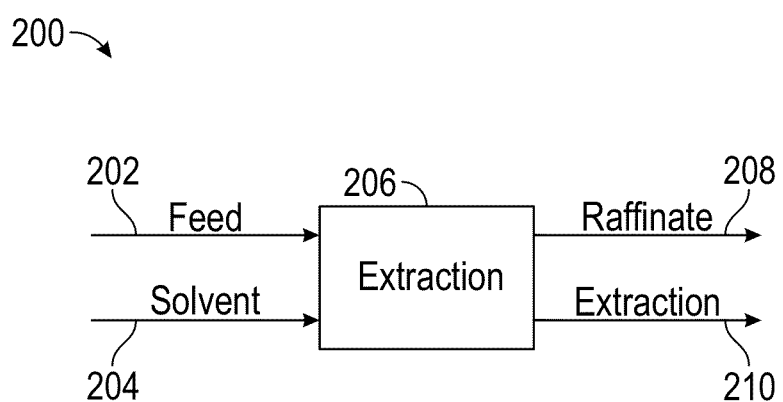
FIG. 2 illustrates an exemplary liquid-liquid extraction process relating to some embodiments of the present disclosure.

FIG. 2 illustrates an exemplary liquid-liquid extraction process 200 relating to some embodiments of the present disclosure. A feedstock 202 and a solvent 204 are provided to an extraction unit 206. Similar to the feedstock 102, as described above, the feedstock 202 may comprise TMSOH with an HMDSO impurity. The solvent 204 may comprise any combination of methanol and water. For example, a solvent is contemplated comprising a 40/60 methanol to water ratio by weight. However, it should be understood that other ratios of the solvent 204 are also contemplated. For example, in some embodiments, a 30/70 methanol to water ratio by weight is used. In some embodiments, a water-miscible solvent may be selected as methanol, acetone, or another suitable form of water-miscible solvent. Further, in some embodiments, a water immiscible solvent, such as hexane or HMDSO is contemplated to increase a working volume of an organic phase within the extraction unit 206 to thereby improve handling.

In some embodiments, the extraction unit 206 comprises a mixing mechanism such as a mechanical stirrer or other form of mixing device for combining the feedstock 202 and the solvent 204. The extraction unit 206 separates the feedstock 202 and solvent 204 into a raffinate 208 and extract 210. The raffinate 208 and the extraction 210 may be separated as two distinct phases present in the extraction unit 206. For example, the raffinate may be separated as an aqueous phase and the extraction 210 may be separated as an organic phase. In some such embodiments, the densities of the aqueous phase and the organic phase may be distinct such that one of the phases may be separated out from a bottom of the extraction unit. The raffinate 208 comprises the product such as a pure or increased purity TMSOH in an aqueous phase. The extract 210 comprises the HMDSO impurity in an organic phase. In some embodiments, water-miscible organic solvents and solutes of interest are rejected from an aqueous phase by the introduction of salts.

Figure 3:
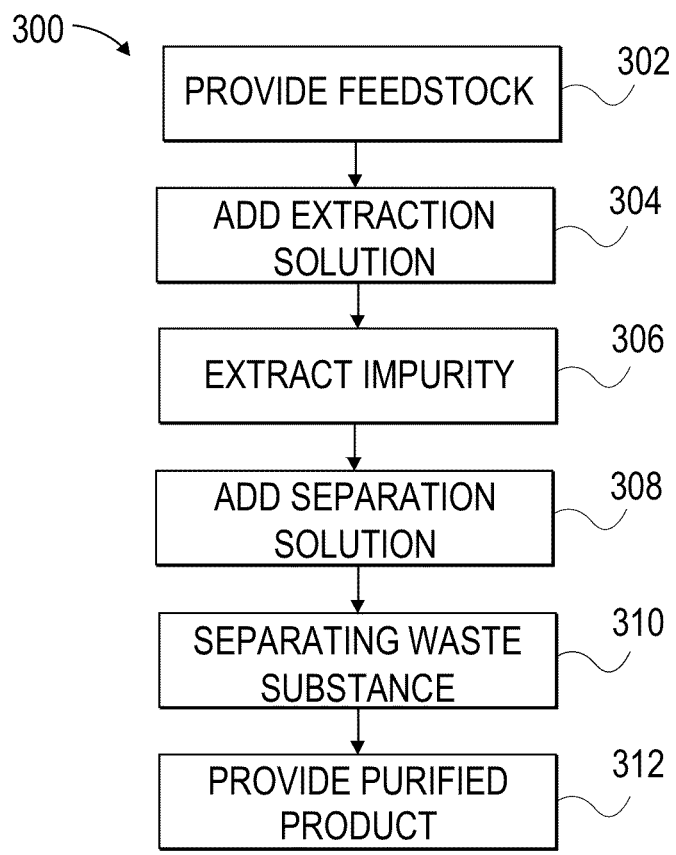
FIG. 3 illustrates an exemplary method of purifying TMSOH relating to some embodiments of the present disclosure.

FIG. 3 illustrates an exemplary method 300 of purifying TMSOH relating to some embodiments of the present disclosure. In some embodiments, at least a portion of the steps described herein may be carried out automatically. For example, embodiments are contemplated in which at least one processor executes computer-executable instructions stored on one or more non-transitory computer-readable media to perform at least a portion of the method 300.

At step 302, a feedstock substance is provided. In some embodiments, the feedstock substance comprises a non-purified form of TMSOH, such as TMSOH with a HMDSO dimerization impurity, as described above with respect to the feedstock 102. For example, the initial purity of the TMSOH within the feedstock substance may be approximately 46.7% or 75%. However, it should be understood that other purities are contemplated and that, in some cases, the initial purity of the feedstock may be unknown. Alternatively, or additionally, in some embodiments, the feedstock substance comprises a formerly purified TMSOH substance that has been stored and potentially formed an impurity.

At step 304, an extraction solution, such as the extraction solution 106 comprising methanol and water or another suitable extraction solution, as described above, is added to the feedstock substance. In some embodiments, the extraction solution may be added to the feedstock substance within the extraction unit 104, as described above. In some embodiments, multiple separate extraction solutions may be added. For example, a first extraction solution with a first extraction ratio may be added at a first stage and a second extraction solution with a second extraction ratio may be added at a second stage. Alternatively, or additionally, multiple extraction solutions may be added at distinct stages with the same extraction ratio.

At step 306, the impurity is extracted from the feedstock. The impurity may be extracted via a liquid-liquid extraction technique as described in detail with respect to FIG. 2 above. Through extraction, the feedstock may be separated into the extracted impurity and the remaining process substance. For example, in some embodiments, the impurity may be extracted out as an organic phase of the initial feedstock after the extraction solution is added.

At step 308, a separation solution is added to the process substance. The separation solution may comprise the separation solution 112, as described above, or another suitable washing/separation substance such as any of salt water, deionized water, as well as other suitable substances configured to separate methanol and other waste products from the process substance.

At step 310, a waste substance is separated from the process substance. The waste substance may comprise any combination of salt water, deionized water, and methanol separated out from the process substance. In some embodiments, at least a portion of the initial TMSOH may be lost during the washing and separation stages. For example, a small amount of TMSOH may be separated out along with the waste substance. However, the amount of TMSOH that is lost may be non-substantial such that a suitable amount of TMSOH remains after washing and separation. In some embodiments, deionized water is added along with a saturated sodium chloride solution (salt water) to prevent salt precipitation.

At step 312, a purified product is provided. The purified product comprises TMSOH with an improved purity compared to the initial feedstock at step 302. In some embodiments, the purity is provided in a range from 95% to 99%. Further, embodiments are contemplated in which the purity of the TMSOH in the purified product is at or greater than 97%.

In some embodiments, at least a portion of the steps described herein may be carried out at room temperature without any additional heating to prevent further dimerization of the TMSOH. Further, in some embodiments, each of steps 302 through 312 occur at room temperature.

In some embodiments, additional steps may be included. Further, embodiments are contemplated in which one or more steps of the method 300 are repeated. For example, steps 308 and 310 may be repeated one or more times to further remove waste and purify the product. In some embodiments, the number of washing and separation stages may be selected to achieve a particular purity of the product. Similarly, additional extraction stages may be included. For example, steps 304 and 306 may be repeated one or more times to remove a larger amount of the impurity compared to a process with a single extraction. Alternatively, or additionally, in some embodiments, the number of extraction and washing stages may be selected based at least in part on a desired volume of the purified product. For example, the number of washing stages may be reduced to provide a larger volume of the purified product at a relatively lower purity, as compared to embodiments with more washing stages that provide a smaller volume of purified product at a higher purity.

In some embodiments, additional steps may be included for measuring the purified project. For example, in some embodiments, after the purified product is provided at step 312, the purified product may be measured to determine a purity level of the purified product. In some such embodiments, further purification steps may be performed if the purified product does not meet a minimum purity threshold. For example, in some embodiments, if the purity level of the purified product is below 97.5%, each of steps 302 through 312 may be repeated on the purified product to further purify the product. In some embodiments, additional steps may be included to initially analyze the feedstock provided at step 302. For example, the feedstock substance may be analyzed, for example, to determine an initial purity. In some such embodiments, one or more steps may be adjusted or added based at least in part on the initial purity or other parameters of the feedstock substance. For example, one or more ratios of any of the extraction solution or the number of washing/separation stages may be selected based on the initial purity.

Embodiments are described above in which TMSOH is purified, however, further embodiments are contemplated in which the methods and processes described herein include initial synthesis and production of TMSOH followed by purification. For example, one or more steps may be included for producing the TMSOH feedstock from hydrolysis of HMDS. Further, in some embodiments, the steps described above with respect to method 300 may be repeated any number of times. For example, the steps may be repeated periodically throughout a storage life of the TMSOH to repurify the feedstock.

EXAMPLES

Examples relating to an exemplary purification process in accordance with the present disclosure will now be described. Tunable extraction of TMSOH from HMDSO was experimentally demonstrated using MeOH and water as extraction co-solvents to validate Universal Quasi-Chemical Functional-group Activity Coefficients (UNIFAC) modeling results. Extractions of TMSOH from 46.7% TMSOH stock was done by addition of various MeOH/water mixtures ranging from 30-100 percent by weight water, with solutions containing 80% or more methanol resulting in a single liquid phase.

Extraction solutions of 30, 40, 50, and 60 percent by weight water were used at 2:1 extraction solution-to-silicone ratio; TMSOH content remained 46.7% in HMDSO. Recovery of crude TMSOH from the isolated aqueous phase was done by addition of 21.2 percent by weight NaCl (80 percent by weight saturated NaCl solution, 20 percent by weight deionized (DI) water by weight) at a 1:1 weight ratio. This NaCl concentration was chosen to prevent NaCl precipitation in the high-methanol samples. Subsequent vortex mixing for 2 minutes and centrifugation lead to a TMSOH-rich organic layer containing high levels of methanol. The crude TMSOH was washed twice with NaCl solution to remove the MeOH—once with 21.2 percent by weight NaCl and once with 15.9 percent by weight NaCl solution at a 1:1 weight ratio to provide the final TMSOH product.

Sample purity for each sample was estimated by Fourier Transform Infrared Spectroscopy (FTIR). TMSOH purity from the sample extracted with 40/60 MeOH/Water was also validated by Gas Chromatography with Flame Ionization Detection (GC-FID), due to the low accuracy of infrared (IR) yield estimates for high-purity samples. With this, TMSOH purity of 98.0% was confirmed in the 40/60 MeOH/water extracted sample. A second sample of the 40/60 MeOH/water extraction was prepared to verify results, and again passed a 97.5% purity threshold with 97.75% TMSOH. Methanol content of the first and second samples analyzed by GC-FID were 0.258% and 0.319% respectively, indicating a third water wash may be used to completely remove residual methanol. In general, process purity followed a strong linear trend between estimated final product purity and water content used in the extraction in the range of extraction solutions tested. The process trend estimates a maximum methanol-to-water ratio in the extraction solution that can be used is 39.4/60.6.

Figure 4:
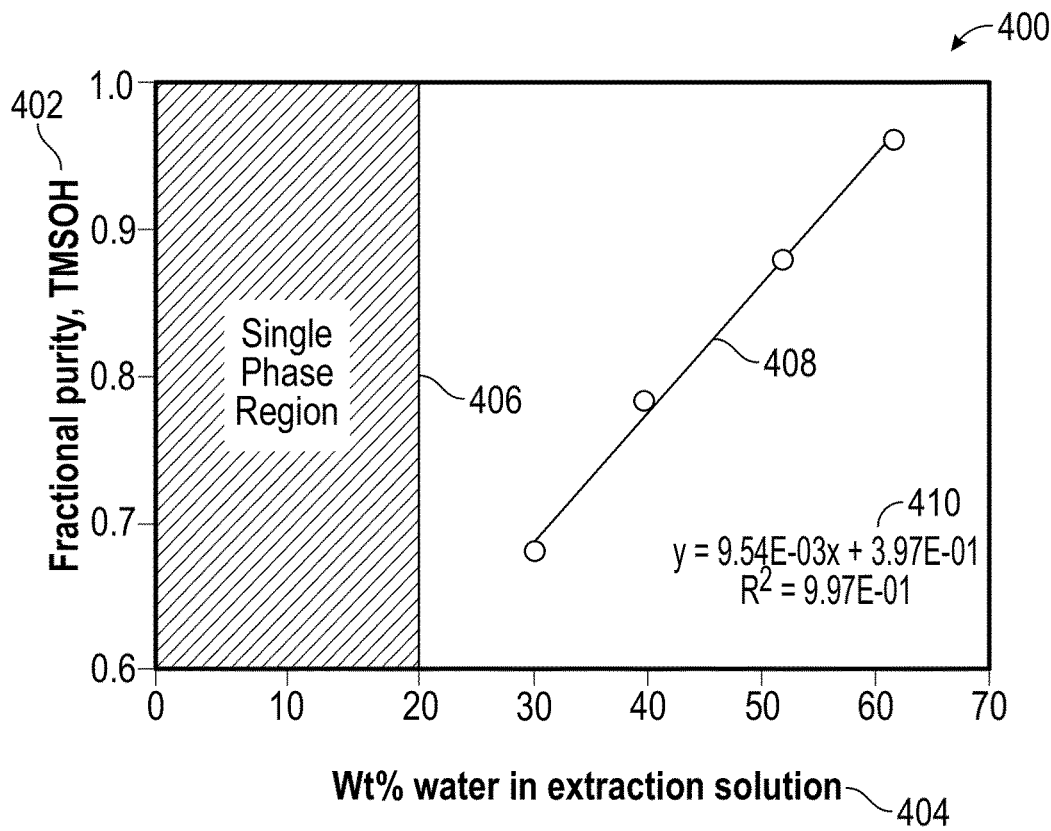
FIG. 4 shows a chart of experimental results of recovered TMSOH purity from TMSOH stock versus weight percent water used in the extraction solution.

FIG. 4 shows a chart 400 of experimental results of recovered TMSOH purity from 46.7% TMSOH stock versus weight percent water used in the extraction solution. The extractions shown are 2:1 extraction solution-to-silicone stock by weight. However, it should be understood that, in some embodiments, other extraction solution-to-silicone radios are also contemplated. For example, in some embodiments, a ratio of extraction solution-to-silicone may be selected from any of 1:1, 1:2, 3:1, or other suitable ratios. Further, in some embodiments, multiple extraction solutions with distinct ratios may be used.

The chart 400 shows fractional purity of TMSOH 402 along the vertical axis over a weight percentage of water in the extraction solution 404 along the horizontal axis. A single phase region 406 is shown from 0 to 20% water indicating a water percentage over which the process substance remains within a single phase.

A line fit 408 is shown within the chart 400 indicating a positive correlation of fractional purity of the purified product with the weight percentage of water in the extraction solution. The line fit 408 was generated based on four samples ranging from 30 to 60% by weight of water within the extraction solution. An example, equation 410 was generated corresponding to the line fit 408 of the experimental results. The equation 410 represents the correlation of fractional purity over weight percentage of water in the extraction solution as $y=9.54E-03\times+3.97E-01$ with a coefficient of determination of $R^2=9.97E-01$.

Four additional samples were processed to validate dilution effects of HMDSO, methanol retention after washing, process variability, and to estimate TMSOH recovery. TMSOH stocks were produced at two separate purities in HMDSO—46.7 percent by weight and 75 percent by weight. Each stock was extracted with 40/60 MeOH/Water in two wash stages using either two or four parts extraction solution per part TMSOH in the system. The recovered aqueous phases from both extraction steps were combined before addition of saturated NaCl solution at a 1:1 volume ratio. A subsequent wash with 15.8 percent by weight NaCl solution and two washes with DI water—all at a 1:1 volume ratio—were done to remove residual methanol. FTIR was immediately taken after processing to estimate sample purity, which showed significant dimer present in sample #3 in the table below. Samples were stored over 3A molecular sieves before being evaluated by GC-FID, which was used to determine final product purity.

TABLE 1

| ID | Initial TMSOH Purity | g Extraction sol./g TMSOH | Approx. Recovery, % | Final TMSOH Content | Final MeOH Content |
|---|---|---|---|---|---|
| 1 | 75% | 2 | 22.8% | 87.87%** | 0.00% |
| 2 | 75% | 4 | 48.8% | 95.62% | 0.00% |
| 3 | 46.7% | 2 | 17.7% | 72.60% | 0.00% |
| 4 | 46.7% | 4 | 37.6% | 94.43% | 0.00% |

Of the four samples, none passed the 97.5% purity threshold despite the same processes used to prepare previous samples that did exceed the purity threshold. As expected, increased HMDSO system content did not significantly impact final TMSOH purity but does impact system recovery, as seen with samples #2 and #4. Further, total methanol removal was validated by the three-wash system. Sample #1 was shown to have lower than expected final purity based on FTIR analysis showing no significant differences between samples #1, #2, and #4. It is possible that dimerization post-process occurred, which was seen in several previously prepared samples.

Proper storage and shelf life of re-purified TMSOH were evaluated to determine suitable storage techniques of the purified product. Formation of significant HMDSO was noticed in several re-purified samples in as little as six days after repurification, while others showed no dimerization over the ten-day span between purification and GC-FID testing. To evaluate ideal storage conditions and identify effects of contaminants, two sets of samples generated from unprocessed 93% TMSOH stock were exposed to different conditions during storage at 45°C for 90 hours. All samples were stored in High-density Polyethylene (HDPE) Falcon tubes and were purged with nitrogen prior to storage. FTIR of pre-storage and post-storage was used to identify major factors that could impact shelf-life. Major variables evaluated include water content, ion exposure, pH, container material, and unidentified impurities in starting materials. Eight samples were prepared as follows:

Sample #1: 2.5 vol % hexanes
Sample #2: Washed with DI water containing carbonic acid (PH ~5.7). TMSOH was extracted from the water layer prior to storage
Sample #3: Sample #2 stored over saturated NaCl solution
Sample #4: Sample #2 Stored over 90/10 DI water/ saturated sodium bicarbonate solution
Sample #5: Sample #2 stored over 3A molecular sieves
Sample #6: Reference material
Sample #7: Sample #2 stored over anhydrous calcium chloride pellets
Sample #8: Stored over fresh 18MΩ water (pH 7)

From these samples, it was determined that residual system water impacted the stability of the TMSOH during storage. Sample #2, which most closely represents re-purified TMSOH, had a reduction in purity to ~58% after aging. Sample #8, which has the highest water content, fully dimerized during storage. Samples stored over aqueous solutions with some desiccating ability (#3, #4) also experienced high dimerization but not to the extent of sample #8. True desiccants improved stability greatly, with sample #5 showing no signs of dimerization from the original product. Samples #1 and #6 also showed no signs of dimerization compared to pre-aging.

The study demonstrated a liquid-liquid extraction process capable of producing a product comprising 97.5% or greater TMSOH purity from HMDSO impurity using a salting-out assisted liquid-liquid extraction approach. System modeling by UNIFAC and experimental validation have determined that the allowable limit for a suitable extraction solution is 40/60 MeOH/water by weight, with lower methanol content expected to provide high purity material. Alternatively, re-evaluation of product purity thresholds or TMSOH synthesis may offer more sustainable routes for use of TMSOH in full-scale production.

Extractions were tested at 1:1 and 2:1 by weight of extraction solution-to-silicone stock weight (i.e., TMSOH plus HMDSO weight) using 46.7% TMSOH in HMS to evaluate rough silicone partitioning and solubility as validation against UNIFAC models. Samples were mixed for a minimum of two minutes on a vortex mixer prior to centrifugation and separation of the component phases. IR absorbance of the Si—CH$_3$ bond centered at 1250 cm$^{-1}$ in the aqueous phase is used as the indicator for total silicone concentration (TMDS+HMDSO), and silanol absorbance centered at 880 cm$^{-1}$ gives semi-quantitative data of TMSOH content. Linearity was shown between water content and total silicone content for the 1:1 by weight extractions. An extraction ratio of 2:1 showed lower total silicone at 30 and 40 percent by weight water, due to nearly all identifiable TMSOH being extracted from the organic phase at these levels. Trends are in general agreement with UNIFAC results.

An FTIR-GC calibration curve was generated for use in TMSOH containing 7-53% HMDSO. Two lots of commercial TMSOH were evaluated by GC-FID and determined to contain 93.0 percent by weight and 46.7 percent by weight TMSOH by GC-FID. Mixtures of these lots were combined at various levels and evaluated by FTIR. The ratio of siloxane (Si—O—Si, 995-1103 cm$^{-1}$) to silanol (Si—OH, 856-891 cm$^{-1}$) absorbance areas given a 2-point baseline was used as the calibration input. FTIR purity estimation is only suitable for final TMSOH evaluation where minimal residual methanol exists due to peak overlap at ~1050 cm$^{-1}$. Several re-purified samples.

Figure 5:
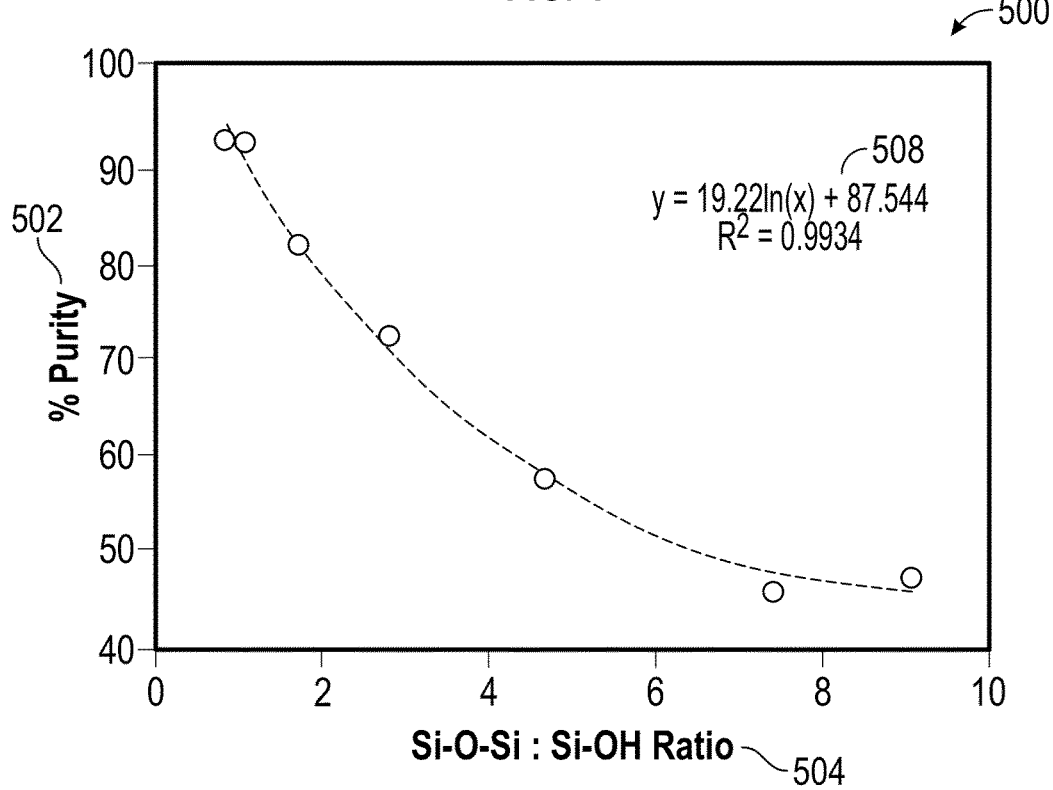
FIG. 5 illustrates a chart showing an exemplary FTIR calibration curve relating to some embodiments of the present disclosure.

FIG. 5 illustrates a chart 500 showing an exemplary FTIR calibration curve relating to some embodiments of the present disclosure. The chart 500 shows a percentage purity 502 of the product along the vertical axis over the ratio of siloxane to silanol 504 along the horizontal axis.

The chart 500 includes fit curve 506 fit over a plurality of samples. The fit curve 506 indicates a negative correlation between purity percentage of the product and the siloxane to silanol ratio. For example, generally, as the siloxane to silanol ratio increases, the product purity decreases. An equation 508 corresponding to the fit curve 506 was determined to be y=−19.22 ln(x)+87.544 with a coefficient of determination of $R^2$=0.9934. Accordingly, embodiments of the present disclosure contemplate using a relatively lower siloxane to silanol ratio such as a ratio of about 1.0 siloxane to silanol to provide a relatively higher product purity. Alternatively, or additionally, in some embodiments, a ratio of siloxane to silanol below 1.0 may be selected.

It should be understood that the experimental examples described above are just a few examples of the purification processes and methods referred to herein and that other examples are also contemplated. For example, in some embodiments, additional process stages and storage techniques are contemplated. Further, the ratios and specific substances referred to in the examples may be adjusted, for example, to achieve a particular purity level of the product.

Clause 1. A method of purifying trimethylsilanol (TMSOH) from hexamethyldisiloxane (HMDSO), the method comprising: providing a feedstock to an extraction unit, the feedstock comprising: TMSOH with an HMDSO impurity; adding an extraction solution to the feedstock within the extraction unit, the extraction solution comprising methanol and water; extracting at least a portion of the HMDSO impurity from the feedstock within the extraction unit; providing the feedstock including the extraction solution from the extraction unit to a phase separation unit; adding a separation solution to the feedstock within the phase separation unit; separating a waste substance from the feedstock from the phase separation unit, the waste substance comprising at least a portion of the separation solution and the extraction solution; and providing a purified product comprising TMSOH with a purity of above 95%.

Clause 2. The method of clause 1, further comprising: adding deionized water to the feedstock within a washing unit; and separating a subsequent waste substance comprising at least a portion of the deionized water and the extraction solution.

Clause 3. The method of clause 1, wherein the extraction solution comprises a 40/60 methanol to water ratio by weight.

Clause 4. The method of clause 1, wherein the extraction solution comprises a 30/70 methanol to water ratio by weight.

Clause 5. The method of clause 1, wherein the extracting occurs at room temperature.

Clause 6. The method of clause 1, wherein the phase separation unit comprises a membrane separator.

Clause 7. The method of clause 1, wherein the phase separation unit comprises a settler column, the method further comprising: prior to separating the waste substance, allowing a portion of the feedstock to settle into the settler column.

Clause 8. A method of purifying trimethylsilanol (TMSOH) from hexamethyldisiloxane (HMDSO), the method comprising: providing a feedstock to an extraction unit, the feedstock comprising: TMSOH with an HMDSO impurity; adding an extraction solution to the feedstock within the extraction unit at room temperature; extracting at least a portion of the HMDSO impurity from the feedstock within the extraction unit; adding salt water to the feedstock; separating a waste substance from the feedstock at room temperature, the waste substance comprising at least a portion of the salt water and the extraction solution; and providing a purified product comprising TMSOH with an increased purity compared to the feedstock.

Clause 9. The method of clause 8, further comprising: providing the feedstock including the extraction solution from the extraction unit to a phase separation unit at room temperature.

Clause 10. The method of clause 9, wherein the increased purity of the purified product is above 97%.

Clause 11. The method of clause 9, wherein the feedstock is continuously purified within a continuous purification loop.

Clause 12. The method of clause 9, wherein the extraction solution comprises methanol and water.

Clause 13. The method of clause 9, wherein the extraction solution comprises ethanol and water.

Clause 14. The method of clause 9, further comprising: drying the feedstock over one or more molecular sieves to thereby remove methanol and water from the feedstock.

Clause 15. The method of clause 9, wherein the salt water comprises a sodium chloride based salt.

Clause 16. The method of clause 9, wherein the salt water comprises a calcium chloride based salt.

Clause 17. The method of clause 8, further comprising: after separating the waste substance from the feedstock, adding deionized water to the feedstock; and separating additional waste substance from the feedstock.

Clause 18. A purification process for purifying trimethylsilanol (TMSOH) from hexamethyldisiloxane (HMDSO), the purification process comprising: providing a feedstock comprising: TMSOH with an HMDSO impurity; performing one or more extraction routines comprising: adding an extraction solution to the feedstock at room temperature; and extracting at least a portion of the HMDSO impurity from the feedstock; performing a plurality of washing routines, each washing routine of the plurality of washing routines comprising: adding a separation solution to the feedstock; and separating a waste substance from the feedstock at room temperature, the waste substance comprising at least a portion of the separation solution and the extraction solution; and providing a purified product comprising TMSOH with an increased purity compared to the feedstock.

Clause 19. The purification process of clause 18, wherein a number of washing routines in the plurality of washing routines and a number of extraction routines in the one or more extraction routines are selected based on a desired purity of the purified product.

Clause 20. The purification process of clause 18, wherein at least a portion of the purification process comprises a batch process that occurs within a batch reactor.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method of purifying trimethylsilanol (TMSOH) from hexamethyldisiloxane (HMDSO), the method comprising:
   providing a feedstock to an extraction unit, the feedstock comprising:
      TMSOH with an HMDSO impurity;
   adding an extraction solution to the feedstock within the extraction unit, the extraction solution comprising methanol and water;
   extracting at least a portion of the HMDSO impurity from the feedstock within the extraction unit;
   providing a post-extraction stock from the extraction unit to a phase separation unit, the post-extraction stock comprising at least a portion of the feedstock and at least a portion of the extraction solution;
   adding a separation solution to the post-extraction stock within the phase separation unit, the separation solution comprising salt water;
   separating a waste substance from the post-extraction stock within the phase separation unit, the waste substance comprising at least a portion of the separation solution and the extraction solution; and
   providing a purified product comprising TMSOH with a purity of above 95%.

2. The method of claim 1, further comprising:
   adding deionized water to the post-extraction stock within a washing unit; and
   separating a subsequent waste substance comprising at least a portion of the deionized water and the extraction solution.

3. The method of claim 1, wherein the extraction solution comprises a 40/60 methanol to water ratio by weight.

4. The method of claim 1, wherein the extraction solution comprises a 30/70 methanol to water ratio by weight.

5. The method of claim 1, wherein the extracting occurs at room temperature.

6. The method of claim 1, wherein the phase separation unit comprises a membrane separator.

7. The method of claim 1, wherein the phase separation unit comprises a settler column, the method further comprising:
prior to separating the waste substance, allowing a portion of the post-extraction stock to settle into the settler column.

8. A method of purifying trimethylsilanol (TMSOH) from hexamethyldisiloxane (HMDSO), the method comprising:
providing a feedstock to an extraction unit, the feedstock comprising:
TMSOH with an HMDSO impurity;
adding an extraction solution to the feedstock within the extraction unit at room temperature, the extraction solution comprising methanol and water;
extracting at least a portion of the HMDSO impurity from the feedstock within the extraction unit to form a post-extraction stock;
adding salt water to the post-extraction stock;
separating a waste substance from the post-extraction stock at room temperature, the waste substance comprising at least a portion of the salt water and the extraction solution; and
providing a purified product comprising TMSOH with an increased purity compared to the feedstock.

9. The method of claim 8, further comprising:
providing the post-extraction stock including the extraction solution from the extraction unit to a phase separation unit at room temperature.

10. The method of claim 9, wherein the increased purity of the purified product is above 97%.

11. The method of claim 9, wherein the post-extraction stock is continuously purified within a continuous purification loop.

12. The method of claim 9, wherein the extraction solution further comprises ethanol.

13. The method of claim 9, further comprising:
drying the post-extraction stock over one or more molecular sieves to thereby remove methanol and water from the feedstock.

14. The method of claim 9, wherein the salt water comprises a sodium chloride based salt.

15. The method of claim 9, wherein the salt water comprises a calcium chloride based salt.

16. The method of claim 8, further comprising:
after separating the waste substance from the post-extraction stock, adding deionized water to the post-extraction stock; and
separating additional waste substance from the post-extraction stock.

17. A purification process for purifying trimethylsilanol (TMSOH) from hexamethyldisiloxane (HMDSO), the purification process comprising:
providing a feedstock comprising:
TMSOH with an HMDSO impurity;
performing one or more extraction routines comprising:
adding an extraction solution to the feedstock within an extraction unit at room temperature, the extraction solution comprising methanol and water; and
extracting at least a portion of the HMDSO impurity from the feedstock to form a post-extraction stock;
performing a plurality of washing routines, each washing routine of the plurality of washing routines comprising:
adding a separation solution to the post-extraction stock within a separation unit, the separation solution comprising salt water; and
separating a waste substance from the post-extraction stock at room temperature, the waste substance comprising at least a portion of the separation solution and the extraction solution; and
providing a purified product comprising TMSOH with an increased purity compared to the feedstock.

18. The purification process of claim 17, wherein a number of washing routines in the plurality of washing routines and a number of extraction routines in the one or more extraction routines are selected based on a desired purity of the purified product.

19. The purification process of claim 17, wherein at least a portion of the purification process comprises a batch process that occurs within a batch reactor.

20. The purification process of claim 17, wherein the feedstock, post-extraction stock, and purified product are maintained at room temperature throughout the purification process to prevent further dimerization of TMSOH into HMDSO.

* * * * *